US006941736B2

(12) United States Patent
Freeman

(10) Patent No.: US 6,941,736 B2
(45) Date of Patent: Sep. 13, 2005

(54) HARVESTER CONTROL

(76) Inventor: James M. Freeman, 1812 11th St. SW., Minot, ND (US) 58701

( * ) Notice: Subject to any disclaimer, the term of this patent is extended or adjusted under 35 U.S.C. 154(b) by 0 days.

(21) Appl. No.: 10/625,269

(22) Filed: Jul. 23, 2003

(65) Prior Publication Data

US 2005/0016142 A1 Jan. 27, 2005

(51) Int. Cl.7 ............................................. A01D 75/28
(52) U.S. Cl. .................................................. 56/10.2 C
(58) Field of Search ............ 56/10.2 R, 10.2 A–10.2 G, 56/DIG. 15; 701/50; 361/152, 160, 170, 166, 180, 189; 172/2–11

(56) References Cited

U.S. PATENT DOCUMENTS

| 4,130,980 A | * | 12/1978 | Fardal et al. ............. 56/10.2 F |
| 4,727,710 A | * | 3/1988 | Kuhn ....................... 56/10.2 G |
| 4,765,190 A | * | 8/1988 | Strubbe .................... 73/861.72 |
| 5,515,233 A | * | 5/1996 | Hofmann .................... 361/160 |

* cited by examiner

Primary Examiner—Robert E Pezzuto
(74) Attorney, Agent, or Firm—Moore, Hansen & Summer, PLLP

(57) ABSTRACT

A control system for a grain harvester. The control system monitors the output of a grain sensor and uses the monitored value to actuate one or more relays having different energization levels. As each relay is actuated it completes a circuit, which is used to modify power that is fed into a control mechanism and which is used to control an operational parameter of the harvester. Depending upon the monitored value of the sensor, the control system will modify the power that supplies a control mechanism that is used to control an operational parameter of the harvester, such as the groundspeed. If the output from the sensor is less that a predetermined threshold, the harvester will operate normally. If the output of the sensor is above a first threshold, the control system will modify the supply voltage. If the output of the sensor is greater than a second threshold, the control system will modify the supply voltage accordingly, and so forth. If the output of the sensor is greater than a maximum upper threshold, the control system will actuate an alarm so that the operator of the harvester may take corrective action.

15 Claims, 2 Drawing Sheets

HARVESTER CONTROL

FIELD OF THE INVENTION

The present invention relates to agricultural harvesting equipment. More particularly, the present invention relates to a method and apparatus for increasing the efficiency of grain harvesters.

BACKGROUND OF THE INVENTION

Grain harvesters have been in existence for many years. Originally developed to eliminate the arduous task of cutting grain by hand with a sickle or scythe prior to threshing, harvesters have evolved into large self-powered machines that are able to perform may steps that were once done by hand. With the modern self-propelled harvester, a single operator can now cut, thresh, and clean many acres of grain in a continuous operation—all from the comfort of an enclosed, air-conditioned cab. Modern grain harvesters typically include a large front facing header having a cutter bar and a horizontally rotatable reel with paddles or tines. The reel positions the crop relative to the cutter bar and sweeps or rakes it into the harvester after it has been cut from the stalk. The cut crop is then conveyed by a series of mechanisms, such as rotating augers and elevators, to a threshing station where the grain is separated from the crop, most often by a rotor that draws the crop past an arcuately shaped metal grill. The grain is then cleaned, usually by transporting it past a sieve or sifting mechanism, which is provided with a variable speed blower that introduces a stream of air therethrough in a generally vertical and angled direction, and which is powerful enough to carry comparatively less dense material, typified by chaff, away from the sieve, while allowing denser material such as grain to fall down through the sieve and into a collection bin for further processing. The chaff, along with other waste material such as the leaves and stems of the crop and the occasional tare, is then conveyed along the harvester by agitators, which shake out residual grains and unthreshed heads and send them back to be rethreshed, leaving the remainder of the waste material to be directed out of the harvester for subsequent disposal.

As will be appreciated, there may be occasions where not all of the grain will be recovered for re-threshing and some grain will be expelled along with the chaff. Thus, many harvesters are provided with one or more sensors that monitor grain as it passes thereby. These sensors often take the form of transducers that detect grain impacts, but they may also detect grain using acoustic or optical detectors, or microwaves, for example. The sensors are typically located adjacent to the chaff and tailing discharge chute of the harvester, and are connected to a meter that is located in close proximity to the operator of the harvester.

In operation, the aforementioned sensors will a produce a signal that is proportional to the amount of grain detected, and the signal will power the meter accordingly. Usually, the meter will be capable of indicating if there is no grain loss, if there is grain loss within an acceptable predetermined range of values, or if the grain loss is unacceptably high. As will be appreciated, the meter may be analog or digital. Operation is straightforward. If, for example, the amount of grain being discharged with the chaff and tare is below a predetermined threshold, the meter will not be actuated and the harvester may operate normally. If the meter indicates that the amount of grain being discharged with the chaff is within a predetermined range of values, the meter will be actuated and the operator will know that grain loss is elevated and that the operation of the harvester operation should be monitored more closely. If the meter moves past the upper range of normal operation, the operator stops the harvester so that it may purge itself. It will be appreciated that while the predetermined range of upper and lower values may be arbitrarily set, the upper value is usually chosen to represent the harvester's maximum capacity. Thus, it is desirable to make adjustments to the harvester before the upper value is exceeded. Usually the ground speed is reduced.

A drawback to the above system is that it is possible for the harvester to operate at or near the upper end of its meter's safe range of operation, which means that the harvester is operating at a comparatively high grain loss level. While such a condition may be acceptable for short periods of time, over the long haul grain loss may be substantial.

Another drawback is that in heavy and/or downed crop situations, the meter has to be monitored more carefully. This diverts attention to other aspects of the harvesting operation and it becomes easier for the operator to become distracted—with potentially serious consequences. Moreover, loss of grain that may be otherwise harvested leads to unprofitability.

There is a need for a control system that is able to minimize grain loss in a harvester. There is also a need for a control system that is able to simplify operation of a harvester by reducing the number of operational parameters that need to be monitored by the operator. There is also a need for a control system that is able to adjust an operating parameter of a grain harvester as the grain harvester is in operation. There is also a need for a control system that is able to adjust the operating parameter in response to a grain sensor signal. There is yet another need for a control system is able to adjust an operating parameter by forming at least one discrete circuit that is connected to, and which modifies the power supply of an operating parameter. There is still another need for a control system that is able to adjust the ground speed of a harvester. And there is a need for a control system that may be easily overridden by an operator of the harvester.

BRIEF SUMMARY OF THE INVENTION

Generally, the control system and method of the present invention operates by using the output of a sensor to adjust an operating parameter of a harvester. More particularly, the control system monitors the output signal of a grain sensor and uses the value of the sensor signal to adjust the power that is supplied to a control mechanism, which controls an operating parameter of the harvester. As grain is detected, an electrical signal that is generated by the sensor and communicated to a meter located in close proximity to an operator of the harvester, is also fed into the control system. Because the signal generated by the sensor is proportional to the amount of grain detected, the control system is configured and arranged so that it is able to respond to different sensor signal values. This is achieved by using the sensor signal to actuate one or more relays having different energization levels to form one or more circuits. Each of the circuits is operatively connected to the power source for the control mechanism, and each of the circuits is capable of modifying the power source that is connected thereto.

For example, if the value generated by the sensor is greater than a first predetermined value, the control system will react by forming a circuit that modifies or alters the power that is supplied to a control mechanism. If the value generated by the sensor is greater than a second predetermined value, the control system will react by forming a second circuit, and the first and second circuits are used to modify or alter the power that is supplied to the control mechanism, and so on. It will be appreciated that the number of circuits formed by the control system may vary from application to application.

An object of the present invention is to reduce the number of distractions that an operator of a harvester has to be aware of.

Another object of the invention is to provide a control system that can be easily incorporated into existing electrical systems.

A feature of the present invention is that the control system comprises a relay arrangement.

An advantage of the present invention is that the control system may be used to modify an operating parameter of the harvester as it moves relative to the ground.

Another advantage of the invention is that the control system improves the efficiency of a harvester by reducing the amount of grain lost while the harvester is in motion.

Yet another advantage of the present invention is that harvester operation is simplified by reducing the number of operating parameters that must be monitored during operation.

Additional objects, advantages and features of the invention will be set forth in part in the description which follows, and in part will become apparent to those skilled in the art upon examination of the following or may be learned by practice of the invention. The objects and advantages of the invention may be realized and attained by means of the instrumentalities and combination particularly pointed out in the appended claims.

DESCRIPTION OF THE PREFERRED EMBODIMENT

Figure 1:
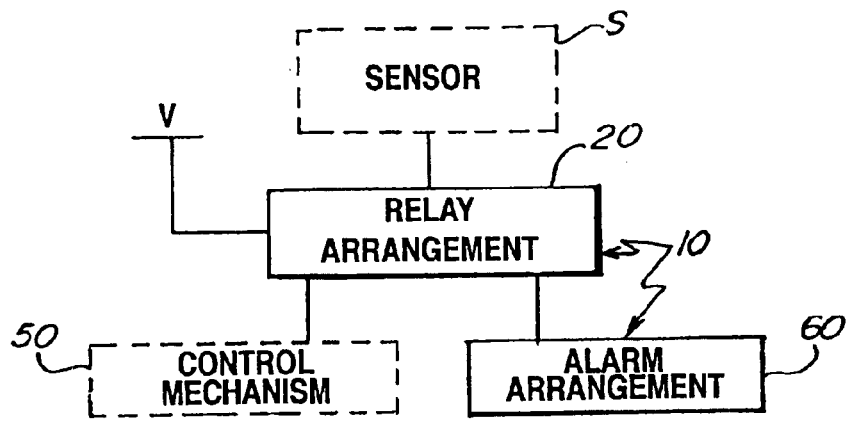
FIG. 1 is a diagrammatic depiction of the control system of the present invention.

Referring to FIG. 1, the general configuration of the harvester control is depicted. As can be seen, the output of a sensor "S" (shown in dashed lines) is operatively connected to a control system 10 whose output is operatively connected to a control mechanism 50 (shown in dashed lines) and an alarm arrangement 60. More particularly, the control system 10 comprises a relay arrangement 20 and an alarm arrangement 60.

Figure 2:
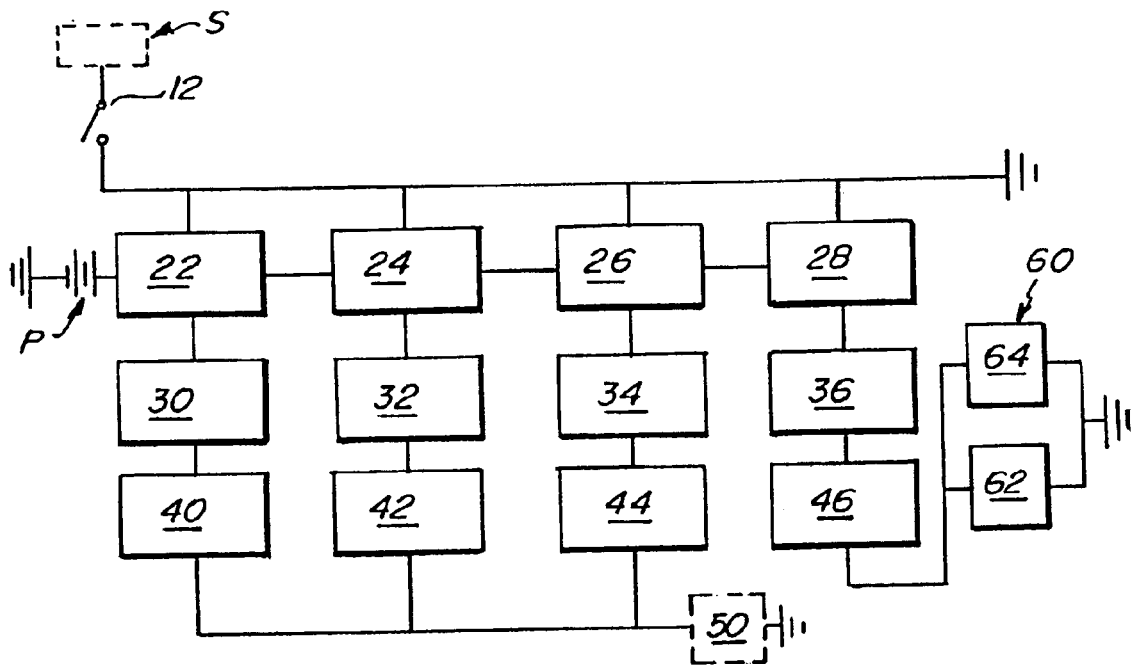
FIG. 2 is a schematic depiction of the control system of the present invention; and, FIG. 3 is a flow chart depicting the operation of the control system.
Figure 3:
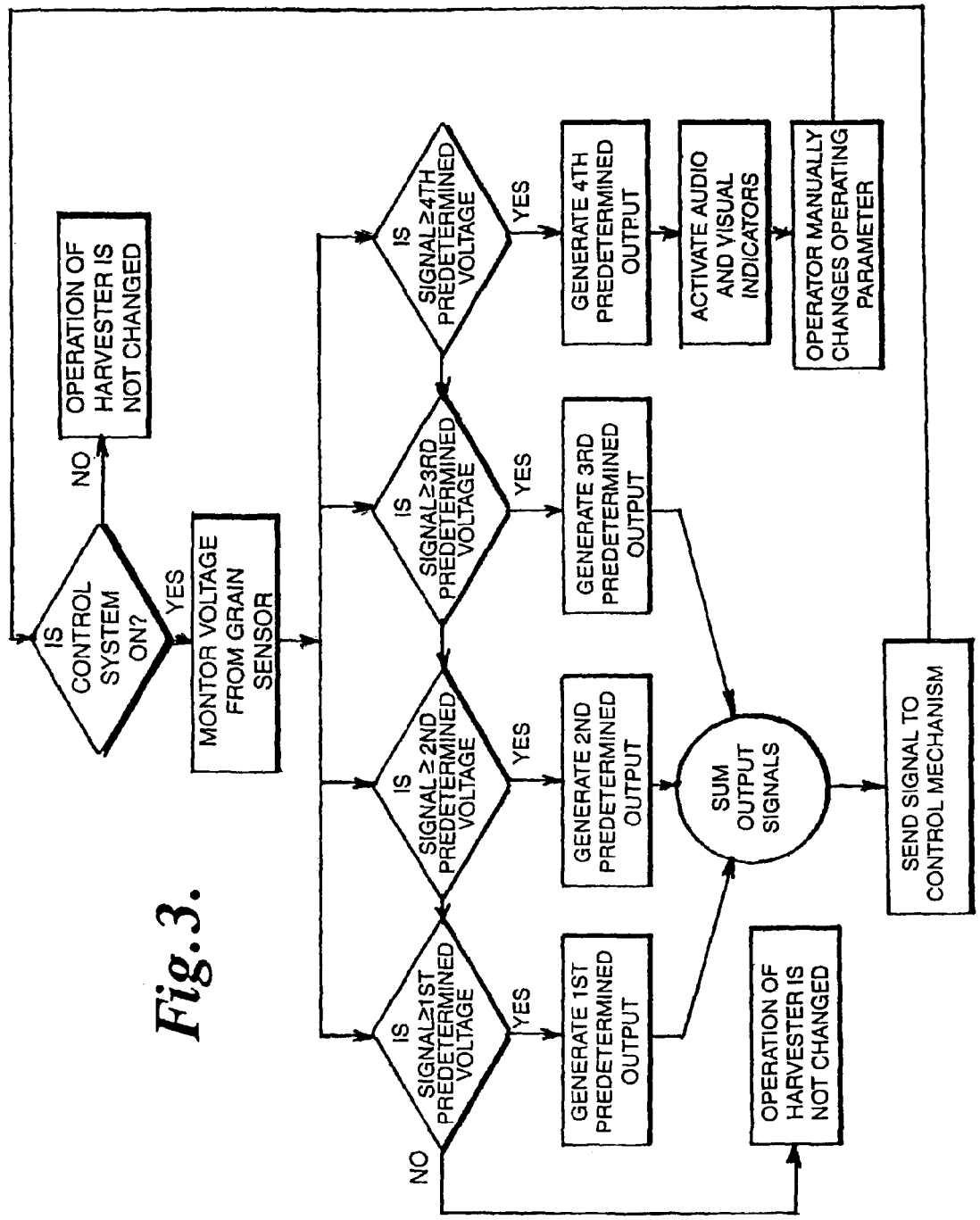

The control system 10 and the relay arrangement 20 are depicted in greater detail in FIG. 2. Starting with sensor "S" the output signal of the sensor is directed to flow into the control system 10 by closing switch 12. The relay arrangement 20 comprises a plurality of relays 22, 24, 26, and 28, which are configured to be energized at predetermined voltages that are within the output range of the sensor. For example, if the voltage output of the sensor "S" varies between 0 and 5 volts, the energization level of the relays would be selected so that they would be operational within the 0 to 5 volt range.

The relays 22, 24, 26, and 28 may have energization levels that are different from each other, and at levels that may be progressively and incrementally higher. Thus, for a sensor whose output signal ranges from 0 to about 5.0 volts, the energization levels for relays 22, 24, 26, and 28 could be 3.0, 3.5, 4.0, and 4.5 volts, respectively. It will be appreciated, however, that the particular number of relays used may be varied without departing from the spirit and scope of the invention—there could be more or less than four relays.

The relay arrangement 20 will now be discussed. As shown, the relay arrangement 20 comprises at least one, and preferably a plurality of, relays that are operatively connected to the output of the sensor "S". As previously mentioned, the relays 22, 24, 26, and 28 may have different energization levels within the output range of the sensor. Relay 22 is of the single pole, double throw (SPDT) variety, and is configured to be energized at a first predetermined threshold of about 3.0 volts. Relays 24, 26, and 28 are also of the SPDT variety, and they may be configured to be energized at different predetermined thresholds. These predetermined thresholds may be set at increasing half-volt increments. Thus relay 24 could have a predetermined threshold of 3.5 volts, relay 26 could have a predetermined threshold of 4.0 volts, and relay 28 could have a predetermined threshold of 4.5 volts, for example. It will be understood that the aforementioned threshold values do not all have to be at one-half volt increments. For instance, the first increment could be one-half volt, while the second third and fourth increments could be set at one volt. It will be appreciated that the above described relay arrangement need not be limited to electromechanical components. Comparators, integrated circuits, and other switching arrangements having one or more voltage thresholds may be used in lieu thereof. Alternatively, the transistors such as bi-polar and field-effect transistors, having appropriate bias voltages may also be used.

As depicted, relays 22, 24, and 26 form circuits that are in communication with a control mechanism 50, while relay 28 forms a circuit that is in communication with an alarm arrangement 60. The circuit formed by relay 22 modifies the power that is normally fed into the control mechanism 50.

More particularly, the circuit formed by the first relay 22 includes a resistor 30 and a diode 40. The resistor 30 may be a variable resistor or potentiometer, varistor, fixed resistor, or an electrical equivalent thereof. When the relay 22 is energized, energy flows from a power source "P" (typically the 12 volt battery of a harvester) and is modified by the resistor in the circuit so that its output is about 2 volts, which is within the operational range of the control mechanism 50. The diode 40 is a zener diode, which is arranged to prevent feedback voltage going into the circuit.

The circuit formed by the second relay 24 includes a resistor 32 and a diode 42. The resistor 32 may also be a variable resistor or potentiometer, varistor, fixed resistor, or an electrical equivalent thereof. When the relay 24 is energized, energy flows from a power source "P" (typically the battery of a harvester) and is modified by the resistor 32 in the circuit so that its output is about 1 volt, which is within the operational range of the control mechanism 50. The diode 42 is a zener diode, which is arranged to prevent feedback voltage going into the circuit.

The circuit formed by the third relay 26 includes a resistor 34 and a diode 44. As with the previous circuits, the resistor 34 may be a variable resistor or potentiometer, varistor, fixed resistor, or an electrical equivalent thereof. When the relay 26 is energized, energy flows from a power source "P" (typically the battery of a harvester) and is modified by the resistor 34 in the circuit so that its output is about 1 volt, which is within the operational range of the control mechanism 50. The diode 44 is a zener diode, which is arranged to prevent feedback voltage going into the circuit.

The circuit formed by the fourth relay 28 also includes a resistor 36 and a diode 46. As with the other circuit components, the resistor 36 may be a variable resistor or potentiometer, varistor, fixed resistor, or an electrical equivalent thereof. When the relay 28 is energized, energy flows from a power source "P" (typically the battery of a harvester) and is modified by the resistor 36 in the circuit so that its output falls within the operational range of the alarm arrangement 60. The diode 46 is a zener diode, which is arranged to prevent feedback voltage going into the circuit.

The control mechanism 50 is configured and arranged to be able to modify an operating parameter of the harvester, for example, the ground speed. Thus, the control mechanism may take the form of a normally open electromechanical valve that has a predetermined operational range of about 0–5 volts, and which may be mounted on the output pressure side of a hydraulic pump that drives the wheels of the harvester. It will be appreciated that the location of the control mechanism at the output pressure side of the hydraulic pump allows the operator to override the control system and increase, decrease, stop, or reverse the ground speed of the harvester. In addition, when the control system 10 is turned off, the control mechanism 50 has no effect on the operation of the harvester and the operator is able to control the ground speed of the harvester in a normal fashion. That is to say, the hydrostatic drive control lever in the operator cab is not affected by the control system when the control system is switched off. Full control of the machine is maintained at all times whether the control system is operating or not.

When the output voltage of from the relay arrangement 20 flows to the control mechanism 50 it changes its operating parameter. More specifically, actuation of relay 22, which forms a first circuit, will close the proportional valve by about 40 percent. Actuation of the second relay 24, which forms a second circuit, will close the proportional valve by about an additional 20 percent. And, actuation of the third relay 26, which forms a third circuit, will close the proportional valve by about an additional 20 percent. Thus, when the control mechanism causes the valve to partially close, fluid flow to the hydraulic motor(s) is decreased and the harvester slows.

The alarm arrangement 60 of the control system 10, as shown, comprises a visual indicator 62 and an audio indicator 64. The visual indicator 62 may comprise a light-emitting diode, and the audio indicator 64 may comprises a buzzer, however, it will be understood that other indicators may be used without departing from the spirit and scope of the invention. It will also be understood that the visual and audio indicators of the alarm arrangement may be arranged to operate signally or sequentially, if desired.

Operation of the control system is straightforward (using a control system that is configured to operate in conjunction with a sensor voltage output in the preferred range of about 0 to 5 volts as an example). When the sensor signal exceeds a first predetermined threshold (in this instance, 3 volts) the signal will register on the meter, which indicates that the amount of grain being lost has exceeded the optimal range. Simultaneously, relay 22 switches on and creates a circuit that allows power to flow through resistor 30 and diode 40 and onto the control mechanism 50. In the preferred embodiment, the control mechanism 50 is a valve that controls the flow of hydraulic fluid to one or more hydraulic motors that are operatively connected to ground wheels of the harvester, with the valve being normally open and which closes in proportion to the magnitude of the power supplied to it. When the circuit is formed, the power to the control mechanism 50 will be modified by a predetermined amount (in this preferred embodiment, about 2 volts) for a valve having an operational range of about 1–5 volts. This will cause the valve to partially close, which slows the ground speed of the harvester. As will be understood, the ground speed of the harvester will continue at this slower rate as long as the sensor output exceeds the predetermined threshold or if the control system 10 is switched off. When the sensor output falls below the predetermined threshold, the relay 22 will be deenergized and the control mechanism will operate normally.

If the sensor signal continues to rise, which indicates that more grain is being lost, the meter will register this increase accordingly. And, if the signal exceeds a second predetermined threshold, the second relay 24 will be switched on, creating a second circuit. When this second circuit is formed, the power to the control mechanism 50 will also be modified by a predetermined amount (in this preferred embodiment, about 1 volt). This value, when combined with the value from the first circuit, will cause the valve of the control mechanism to close further, thus slowing the ground speed of the harvester by an even greater amount. As will be understood, the ground speed of the harvester will continue at this slower rate as long as the sensor output exceeds this second predetermined threshold or if the control system 10 is switched off. When the sensor output falls below the second predetermined threshold, the relay 24 will be deenergized, however the first relay 22 will remain energized until the sensor signal falls below the first predetermined threshold; at which time the control mechanism will operate normally.

If the sensor signal continues to rise, which indicates that even more grain is being lost, the meter will register this increase accordingly. And, if the signal exceeds a third predetermined threshold, the third relay 26 will be switched on, creating a third circuit. When this third circuit is formed, the power to the control mechanism 50 will also be modified by a predetermined amount (in this preferred embodiment, about 1 volt). This value, when combined with the values from the first and second circuits, will cause the valve of the control mechanism to close even further, thus slowing the ground speed of the harvester by an even greater amount. As will be understood, the ground speed of the harvester will continue at this slower rate as long as the sensor output exceeds this third predetermined threshold or if the control system 10 is switched off. When the sensor output falls below the third predetermined threshold, the relay 26 will be deenergized, however the second and first relays 24 and 22 will remain energized. And, when the sensor signal falls below the second predetermined threshold, the second relay 24 will be deenergized, leaving the first relay 22 energized until the sensor signal falls below the first predetermined threshold; at which time the control mechanism will operate normally.

If the sensor signal continues to rise, which indicates that even more grain is being lost, the meter will register this increase accordingly. And, if the signal exceeds a fourth predetermined threshold, the fourth relay 28 will be switched on, creating a fourth circuit. When this fourth circuit is formed, power is supplied to a signal (preferably audio and visual), which is located in close proximity to the operator. Note that the fourth circuit is not in communication to the other circuits, so that the harvester will continue to move forward at a slower rate. So, at this point, the harvester would have to be stopped by the operator so that it may purge itself. As the harvester purges itself, the sensor signal will fall so that the relays 28, 26, 24, and 22 will be sequentially deenergized. It will be appreciated, however, that it is not necessary for the purging process to continue until the grain sensor output signal falls to zero, and that operation of the harvester may continue when the output signal falls below the fourth threshold, if desired.

The present invention having thus been described, other modifications, alterations, or substitutions may present themselves to those skilled in the art, all of which are within the spirit and scope of the present invention. It is therefore intended that the present invention be limited in scope only by the claims attached below:

What is claimed is:

1. A control system suitable for use with a grain harvester of the type having a sensor for detecting grain loss, the control system comprising:

a first relay, the first relay configured to be actuated upon receiving a signal from the sensor, the first relay, when actuated, configured to allow a first predetermined voltage to be communicated to a control mechanism of the harvester; and, a second relay, the second relay configured to be actuated upon receiving a larger value signal from the sensor, the second relay, when actuated, to allow a second predetermined voltage to be communicated to the control mechanism of the harvester;

whereby the control system adjusts an operating parameter of the harvester in response to the effect that the signal from the sensor has on the operation of the first and second relays.

2. The control system of claim 1, wherein the operating parameter is the speed of the harvester relative to the ground.

3. The control system of claim 1, wherein the sensor comprises a transducer.

4. The control system of claim 1, wherein the first and second relays are connected to each other in parallel.

5. The control system of claim 1, wherein the operating parameter is the speed of the harvester relative to the ground.

6. The control system of claim 1, further comprising an alarm arrangement, the alarm arrangement configured to be actuated when the signal of the sensor exceeds an upper threshold.

7. The control system of claim 6, wherein the alarm arrangement comprises an audible indicator.

8. The control system of claim 6, wherein the alarm arrangement comprises a visual indicator.

9. A control system suitable for use with a grain harvester of the type having a sensor for detecting grain loss, the control system comprising:

a relay arrangement, the relay arrangement configured to be actuated upon receiving a signal from the sensor, the relay arrangement, when actuated, configured to allow at least two different voltages to be communicated to a control mechanism of the harvester;

whereby the control system is able to adjust an operating parameter of the harvester in response to the signal from the sensor.

10. The control system of claim 9, wherein the relay arrangement is capable of forming a circuit, the circuit communicating the voltage to the control mechanism of the harvester.

11. The control system of claim 9, wherein the two voltages are communicated to the control mechanism of the harvester through two circuits.

12. The control system of claim 11, wherein the two circuits are connected to each other in parallel.

13. The control system of claim 9, further comprising an alarm arrangement, the alarm arrangement configured to be actuated when the signal of the sensor exceeds an upper threshold.

14. A method of controlling an operating parameter of a grain harvester of the type having a sensor that detects the presence of grain as it passes through the harvester, the method comprising the steps of:

a) monitoring the output of the sensor;

b) actuating a relay when the sensor output reaches a threshold level to communicate a control signal to a control mechanism; and, c) modifying the control signal before it reaches the control mechanism, whereby the operating parameter of the harvester may be adjusted by the sensor output.

15. A method of controlling an operating parameter of a grain harvester of the type having a sensor that detects the presence of grain as it passes through the harvester, the method comprising the steps of:

a) monitoring the output of the sensor;

b) actuating a first relay when the sensor output reaches a threshold level;

c) actuating a second relay when the sensor output reaches a second threshold level, the first and second relays forming a circuit; and, c) using the circuit to communicate a voltage to the control mechanism, whereby an operating parameter of the harvester may be adjusted by the sensor output.

* * * * *